United States Patent
James et al.

(10) Patent No.: US 10,984,157 B2
(45) Date of Patent: Apr. 20, 2021

(54) DRIVELINE MODELLER

(71) Applicant: ROMAX TECHNOLOGY LIMITED, Nottingham (GB)

(72) Inventors: Barry James, Cranage (GB); Sharad Jain, Nottingham (GB)

(73) Assignee: ROMAX TECHNOLOGY LIMITED, Nottingham (GB)

( * ) Notice: Subject to any disclaimer, the term of this patent is extended or adjusted under 35 U.S.C. 154(b) by 409 days.

(21) Appl. No.: 15/776,132

(22) PCT Filed: Nov. 18, 2016

(86) PCT No.: PCT/IB2016/056983
§ 371 (c)(1),
(2) Date: May 15, 2018

(87) PCT Pub. No.: WO2017/085694
PCT Pub. Date: May 26, 2017

(65) Prior Publication Data
US 2018/0365357 A1     Dec. 20, 2018

(30) Foreign Application Priority Data
Nov. 18, 2015 (GB) ..................................... 1520361

(51) Int. Cl.
*G06F 30/20* (2020.01)
*G06F 30/23* (2020.01)
(Continued)

(52) U.S. Cl.
CPC .............. *G06F 30/23* (2020.01); *G06F 30/15* (2020.01); *G06F 30/20* (2020.01); *G06T 17/20* (2013.01);
(Continued)

(58) Field of Classification Search
CPC ............ F16H 2057/0087; G01M 13/00; G06F 2111/20; G06F 30/20; G06F 30/00;
(Continued)

(56) References Cited

U.S. PATENT DOCUMENTS

| | | | |
|---|---|---|---|
| 5,594,651 | A | 1/1997 | St Ville |
| 6,993,463 | B1 | 1/2006 | Ewsuk et al. |

(Continued)

FOREIGN PATENT DOCUMENTS

| | | |
|---|---|---|
| EP | 2587423 A2 | 5/2013 |
| GB | 2506532 A | 4/2014 |

(Continued)

OTHER PUBLICATIONS

Lee et al: "A CAD-CAE integration approach using feature-based multi-resolution and multi-abstraction modelling techniques", Computer Aided Design, Elsevier Publishers BV. vol. 37, No. 9, Aug. 2005, pp. 941-955.

(Continued)

*Primary Examiner* — Kibrom K Gebresilassie
(74) *Attorney, Agent, or Firm* — Maschoff Brennan (57) ABSTRACT

A computer-implemented system is disclosed for producing a design for a rotating machine assembly. It comprises a data module (10) configured for receiving data relating to one or more components of the rotating machine assembly; a user interface module (20 configured for specifying data to be received by the data module and for receiving from a user a type of analysis to be performed on the data; and an analysis module (30) configured for analysing a performance of the rotating machine assembly according to the type of analysis selected and selected features of the data to be used. It further includes a recognition module (40) configured for identifying and selected features of the data be used for the analysis according to the type of analysis selected. It pro- (Continued)

vides an approach for managing and coordinating the data in the design of driveline systems so that the most accurate and informative insight on the driveline's performance is delivered to the engineer at the earliest possible point in the design process, hence product design and optimisation can be carried out as quickly and efficiently as possible. More aspects of product performance are coordinated together and the engineering insight is greater, hence the methodology becomes a platform for making engineering decisions rather than mathematical simulation.

15 Claims, 2 Drawing Sheets

(51) Int. Cl.
*G06F 30/15* (2020.01)
*G06T 17/20* (2006.01)
*G06F 111/20* (2020.01)
*G06F 119/18* (2020.01)
*F16H 57/00* (2012.01)
*G01M 13/00* (2019.01)
*G01N 29/04* (2006.01)

(52) U.S. Cl.
CPC ..... *F16H 2057/0087* (2013.01); *G01M 13/00* (2013.01); *G01N 29/04* (2013.01); *G06F 2111/20* (2020.01); *G06F 2119/18* (2020.01); *Y10T 408/564* (2015.01)

(58) Field of Classification Search
CPC . G06F 2111/02; G01N 29/04; Y10T 408/564; G05B 2219/32359; G05B 2219/35223; G06T 19/00; G06T 2219/2008
See application file for complete search history.

(56) References Cited

U.S. PATENT DOCUMENTS

| | | | | |
|---|---|---|---|---|
| 2001/0016807 A1* | 8/2001 | Hashima | ............ | G05B 19/0426 703/22 |
| 2002/0198680 A1* | 12/2002 | Sato | ........................ | G06F 17/18 702/179 |
| 2004/0044504 A1 | 3/2004 | Shimizu | | |
| 2005/0055183 A1* | 3/2005 | Tani | ........................ | G06T 17/30 703/2 |
| 2005/0171745 A1 | 8/2005 | Breitfeld et al. | | |
| 2006/0161410 A1* | 7/2006 | Hamatani | ............... | G06T 19/20 703/13 |
| 2008/0174611 A1 | 7/2008 | Yagi | | |
| 2010/0151925 A1* | 6/2010 | Vedurmudi | ......... | H04M 1/0274 455/575.4 |
| 2012/0035895 A1 | 2/2012 | Gadhamsetty et al. | | |
| 2013/0085722 A1* | 4/2013 | James | ..................... | G06F 30/15 703/1 |
| 2015/0081261 A1 | 3/2015 | Briggs et al. | | |
| 2015/0149105 A1* | 5/2015 | Chang | .................. | G01B 21/045 702/104 |
| 2016/0179141 A1* | 6/2016 | Kim | ....................... | G06F 1/1652 361/749 |
| 2020/0226302 A1* | 7/2020 | James | ..................... | G06F 30/20 |

FOREIGN PATENT DOCUMENTS

| | | |
|---|---|---|
| JP | 2004-094465 A | 3/2004 |
| JP | 2008-181185 A | 8/2008 |
| JP | 2008-257302 A | 10/2008 |
| WO | 2008126078 A2 | 10/2008 |
| WO | 2014/053817 A1 | 4/2014 |

OTHER PUBLICATIONS

Romax Technology: "CAD Fusion demonstration", youtube, Jun. 19, 2014 (Jun. 19, 2014), p. 8 pp. Retrieved from the Internet: URL:https://www.youtube.com/watch?v=NuF-HEN6sBs.
Anonymous: "Timoshenko beam theory—Wikipedia", Wikipedia, Aug. 12, 2015, Retrieved from the Internet: URL: https://en.wikipedia.org/w/index.php?title=Timoshenko beam theory&01did=675755748.
Alexander Slocum: "FUNdaMENTAlS of Design—Topic 9—Structural Connections and Interfaces", 2008, pp. 1-68, Retrieved from the Internet: URL: http:%3A%2F%2Fpergatory.mit.edu%2Fresources%2FFUNdaMENTAls%2520Book%2520pdf%2FFUNdaMENTAls%2520Topic%25209.PDF.
Xyz Scientific Applications: "TrueGrid: Transitions and Assemblies", May 2, 2015, Retrieved from the Internet: URL: https://web.archive.org/web/20150502143829/http://xyzsa. com/Transition.html.
Walter Frei: "Meshing your Geometry: When to Use the Various Element Types", Nov. 4, 2013, Retrieved from the Internet: URL:https://wwwcomsol. com/blogs/meshing-your-geometry-various-element-types/.
Zienkiewicz O C; Taylor R L; Zhu J Z: "Finite Element Method—Its Basis and Fundamentals. Chapter 8: Automatic mesh generation". Dec. 31, 2005, Elsevier Butterworth-Heinemann, pp. 264-328.
Romax Technology: "3D Geometry Creation & Meshing". Youtube. Aug. 14, 2015, p. 5 pp. Retrieved from the Internet: URL: https://www.youtube.com/watch?v=3qN8Gkalsal.

* cited by examiner

DRIVELINE MODELLER

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Field of the Invention

The present invention is related to the design of drivelines using computer-aided engineering (CAE), the drivelines comprising a system made up of sub-assemblies including internal combustion engines, gearboxes, transmissions, driveshafts, constant velocity joints, universal joints, axles, differentials, generators, motors, flywheels, batteries, fuel tanks, super-capacitors, clutches, gears, pumps, shafts, blades for fans, helicopters, aircraft and wind turbines, vehicles and the like, and the sub-assemblies consisting of shafts, housings, pistons, blades, gears, bearings, clutches, rotors, stators and the like. The present invention is also related to the design of the assemblies that make up the driveline. The term "driveline" includes the terms "drive-train" and "powertrain".

Description of Related Art

Designing a driveline is complex and time consuming. The engineer needs to know that the driveline is fit for purpose before it is made and to determine this various analytical methods are used to judge the performance or likelihood of failure, followed by optimisation to change the product definition so as to maximise the product performance. Analysis, either by mathematical simulation or other methods such as benchmarking (comparison with similar products), is typically carried out in a computer program and the domain of computer-aided engineering (CAE) has grown based on this intention.

BRIEF SUMMARY OF THE INVENTION

The process of setting up the analysis for a given failure mode or aspect of performance requires creating a model of the system, sub-assemblies and components. Thus the process becomes one of (i) Modelling, (ii) Analysis, (iii) and Optimisation.

Different aspects of product performance need to be considered in the design process, including (but not limited to): vehicle/product performance, energy/fuel efficiency/economy, exhaust gas emissions, packaging within the space constraints, cost, weight, structural deflections and stress, durability and fatigue, manufacturability, thermal performance, generation of audible noise, mechanical failure due to dynamic input loads, generation of dynamic loads adverse to the user and/or environment, speed and ratio changing, and satisfactory interaction with a control system.

To assess these different failure modes and aspects of performance, different mathematical analysis methods are used and these require different models of the system, consisting of different data. As a result, it is typical for CAE models for each failure mode to be built specifically for that failure mode. This is illustrated FIG. 1. Indeed, often CAE packages are developed specifically for the purpose of assessing a given failure mode.

To predict the performance of each component or sub-system often requires different computational algorithms. Also, the components are sub-systems are often designed and manufactured by different departments or companies. Thus, often the simulation of that component or sub-system focuses on the component or sub-system alone and ignores or simplifies the interactions that occur with other components or sub-systems. The result can be inaccurate predictions of product performance.

The design of the system evolves as a result of a process, as opposed to undergoing an instantaneous moment of creation. Some of the parameters defining the design are defined at the start of the process, others are not defined until the end.

As a result, different analyses of product performance are carried out at different stages in the design process, even for the same aspect of product performance. Not all the methods are possible at the start. Typically, only relatively simple analyses are possible when the product definition is light, and it is only towards the end of the design process that more complex analyses are possible.

Moreover, for the same failure mode, a simple analysis may be carried out early in the design process and then the a more complex analysis may be carried out later on for the same failure mode, because the product definition is more mature and contains greater fidelity. Often, these different levels of fidelity require different CAE packages, with all the problems of data transfer, data updates within the design process etc.

Overall it can be seen that different models have different purposes and are used at different stages in the design process. No single model definition can be used for the complete design and optimisation of a driveline and the different models, each with their different features and different strengths and weaknesses, are used at different stages of the design process and by different engineering professionals.

This means that a team of designers will use a number of separate applications for analysing the performance of the driveline. To analyse the model at different levels of complexity, they will need to use separate applications for the same performance measure. In addition, a model suitable for mathematical analysis for one performance measure will not be suitable for another. Each member of the design team will need to exercise his or her own knowledge and experience to know (i) what application to select, (ii) what model and level of accuracy to use and (iii) what analysis is required to get the desired result.

In addition, there is a risk that the user will use a detailed analysis when the information describing the rotating machine assembly (input data) merits only a simple analysis; this may lead to errors in the analysis, yet the user may not know.

Furthermore, because the models are created manually, and in different applications, a change in the information describing the rotating machine assembly (product definition) does not, and often cannot, get cascaded to other analyses run in different applications.

This is particularly acute when considering a specific division in engineering activity that takes place during the creation of a product, that between design and analysis. Design, at least for the mechanical engineer, is often considered to concern the definition of the geometry of the product, whereas analysis studies the product in terms of how it functions for the aspects of performance or failure modes. In fact, the geometry that is considered in design is just another aspect of performance—it deals with the question of how the product fits the packaging space available. Yet this aspect of performance is typically dealt with by a completely different computer programme, CAD (Computer Aided Design), which has little or no calculation capability to predict other aspects of product performance, and poor or non-existent links to the analysis packages that do. CAD packages are typically operated by design engineers and analysis packages by analytical engineers. The result is a disconnect in the design process, poor productivity, suboptimal products and wasted economic activity.

There is a further problem with complex analyses. The purpose of any analysis is to guide the design of the product, and so the value of the analysis comes when the result of the analysis is correctly interpreted/understood by the engineering team and the corresponding design decision is made. For a result to be understood, it needs to "make sense" to the engineers and correspond to the way that the engineers understand the system to perform. However, once an analysis becomes highly complex, it is possible that the result will be too complex to be understood or that it does not match the engineers' fundamental understanding of its performance. Thus, even though the analysis result may be the most accurate analysis possible, it will be discarded in the engineering decisions regarding the system.

It is an irony that the engineers' fundamental understanding of the system performance is very closely related to the simple analyses which may have been carried out at the start of the design process. Thus, the tension exists—there is a desire to increase complexity since this is assumed to increase accuracy and product performance, yet take this too far and complex analysis ceases to be of use.

The purpose of these analyses is to avoid failure modes. As the design matures through the design process, the increase in data definition represents an increase in monetary investment into the design, so any identification of failure mode needs to be achieved at the earliest possible opportunity, thereby minimising the financial cost of iterative rework.

This points to a final tension in the process. The process needs to provide speed of modelling and analysis to give the productivity, yet include all the system influences to provide the accuracy. Analysing a larger system with all of the system influences tends to lead towards a more complex analysis, yet as has been discussed this leads to problems with speed of modelling and analysis and in data interpretation.

The solution to this for many has been the development of Application Specific software Packages, where the modelling and analysis functions are pre-defined for a given type of product or application. This allows the desired accuracy of modelling and analysis to be achieved without requiring every product being described from first principles, thereby maintaining productivity.

The current process that has been described for product design is one of creating models of the driveline so as to analyse various failure modes. Due to the natural hierarchy of the order in which design parameters are defined, and the different requirements for each analysis, the different analyses are carried out at different stages in the design process. Hence the design process consists of different representations of the same driveline being created at different stages for different analysis purposes.

Different approaches can be used for dealing with the problems identified in the foregoing, but these all involve multiple pieces of software which are used by engineers of different backgrounds and training.

Ways to Import CAD

With so many different performance criteria being predicted, different CAE packages have been developed. CAD is used to define the form (geometry) of the driveline, Multi-Body Dynamics packages (MBD) and Finite Element Analysis (FEA) packages predict the structural (static and dynamic) performance of the overall system, Specialist Component Packages predict the performance of the individual components (splines, gears etc.), Application Specific Packages combine the performance of several types of components together to describe the performance of the driveline for certain performance targets, multi-domain simulation tools (e.g. Simulink) consider the operation of the driveline within the vehicle system for fuel economy, shift quality etc. Some Application Specific Packages for driveline system simulation allow the overall form of the driveline components to be defined, but the definition falls short of that in a CAD model. Each package has a role to play and the definition of the driveline within that package is tailored to suit the assigned role. No single package has the "complete" definition of the driveline (form, function, material properties and loadcases), in that there is always some data which are missing in each definition which is required for a different purpose.

In any driveline being designed, the form is defined in a CAD package. Upon design completion, the full assembly model forms a Digital Mock Up (DMU) of the assembly, and each component will have its own drawing that is used in its manufacture. It contains all the details regarding the components geometry, material, tolerances etc.

Some Application Specific Packages for driveline system simulation also allow the form of the driveline to be defined, but this is at a high level, including only the details necessary for the prediction (to a given level of fidelity) of some (but not all) performance targets for the driveline such as static deflection, stress, dynamics etc.

The CAD definition has the greater definition of form and material properties but nothing of function, or load cases; The Application Specific Package has a smaller definition of form but more on function and load cases.

So, there are two definitions of form of the driveline in separate packages. In some companies the CAD definition precedes the Application Specific Package and in other companies it is the other way around. For many years, data had to be transferred between these two definitions manually, which is slow, error-prone and problematic for the rapid design-analysis-redesign iterations required for the design of modern products.

Some attempts have been made to automate the process of transferring data from CAD to Application Specific Packages, for example by reading in the 2D profile of a shaft cross section by scanning a paper drawing to create a parametric definition of the shaft in the form of a series of section, but these are highly approximate since each dimension is only an estimate rather than the exact value. In addition, such links can be defined only for shafts, not gears, bearings etc.

(2) & (3) Solid Modelling and FE Meshing in the Multi-Physics Environment and (4) Solving FE in a Multi-Physics Environment The analysis of driveline systems requires that models of many different components are combined, including shafts, bearings, gears, housings and planet carriers. Shafts, gears and bearings are axi-symmetric in their nature and can have parametric definitions that are simple and standardised and thus can be used by across the industry. However, for housings, planet carriers and differential cages, they are non-axi-symmetric and thus standardised parametric definitions and simple analytical models do not exist.

In order to include such components in an analytical model of the gearbox, and FE model of the component needs to be included in the gearbox model and linked to the gears, bearings and shafts in the appropriate manner.

Such an FE model contains many thousands or millions of degrees of freedom, making simulation of any such system slow and computationally expensive. It is common practice to reduce the model to a more manageable size through processes such as Guyan reduction (for static analysis) or Craig-Bampton condensation (for dynamic analysis).

Typically the user will take the solid geometry from CAD, create an FE mesh in an FE pre-processor, import the FE mesh into the analysis package and then connect it to the shafts, bearings and gears. It will then be exported back to an FE solver where model reduction will take place, and the reduced analytical representation of the component will be re-imported into the MBD or Application Specific package.

With the FE model of the housing or planet carrier imported into an MBD or Application Specific package, and connected to the shafts, bearings and gears, the gearbox system is customarily analysed for system deflections or dynamic properties. The loads on the planet carrier and housing are calculated, accounting for the important system influences of shaft deflection, non-linear bearing stiffness etc. To gain the stress on the component under consideration, these loads then have to be re-exported back to the FE Solver where the stress at each point in the component can be calculated. Even after this, the durability of the component requires the stress history to be exported to a specialised Fatigue Simulation package.

This process relies on five different software applications (CAD, FE pre-processor, FE Solver, MBD/Application Specific package, Fatigue Simulation package) and six different inter-package data transfer exercises. In a large corporation, these packages often sit in different functional areas, in different departments and potentially in different geographical locations. Even if they are not, they are run by engineers with different functional expertise who will have demands upon their time due to different projects. Navigating this process is cumbersome with the consequence that it cannot be attempted in the concept design stage, when rapid design-analysis-redesign iterations are required, and even when the design has settled down in the detailed design stage, it hinders design optimisation. The result is that gearbox design is hindered and product quality suffers.

Furthermore, the designer has to make the decision whether the inclusion of such component FE models is or is not important for the given stage in the design process. If such FE models are included, the analysis results may be more accurate but the potential for design changes is severely limited since it would mean embarking on more model importing/exporting. If the designer wishes to retain freedom to modify the design, there is a risk that the analysis results may be inaccurate to the extent that the gearbox design created is not fit for purpose. Conventional packages provide the designer with no guidance as to when to or not to include imported FE models.

In any case, the creation of a solid model of the housing the gearbox design to have reached a certain degree of maturity before the gearbox designer will start modelling in his/her CAD package. The gear centre distances and the bearing locations need to be fixed so that the housing can wrap around the internal components. Due to the substantial work in the creation of a housing model in CAD, the decision to start work on the housing is preceded by a "gateway" review, where the design of the internal components is essentially fixed, even before the housing (whose behaviour, of course, can adversely affect the performance of the internal components) has been designed. Within the practical time constraints of a realistic design project, this process continually fails to provide insight to the engineer, who is left to approximate, hope, and/or continue with risk to the project and/or a sub-optimal gearbox design.

This poor integration of CAD and CAE and poor availability of accurate mathematical models to guide the design process has a particular manifestation in the design of planetary gear (or epicyclic) systems. The properties of the planet carrier have a substantial influence on the static deflections, durability and dynamic properties of the driveline containing the planetary gear, however, until the end of the design process this data is not available. The process of getting the planet carrier modelled in CAD and then meshed in FE (both in separate departments) before being passed back to the driveline engineer can take up to 2 months. Clearly, this is massively sub-optimal.

Where the structural model of a motor is to be included in the driveline system, the same issue occurs. Other examples include differential cages.

Different Ways of Setting Up FE Models—Shafts (5)

The various predictions of the driveline performance require the shaft geometry to be defined so that the shaft's behaviour can be predicted, for example its response to static and dynamic load, and fatigue performance. The conversion from the shaft geometry to the analytical model can take place in various ways. Each cylindrical or conical section can be converted into an equivalent 1D beam element, for example a Timoshenko beam, which has all the properties necessary for static deflections and dynamic response. Where there is a change in shaft section, a shaft will have a fillet radius, with an area of stress concentration, and for a given loading condition this feature is important to determine the peak stress and hence resistance to fracture or fatigue. Two adjacent Timonshenko beams cannot determine this peak stress, but if a stress concentration factor, dependent on the change in section and the fillet radius at this change in section, is determined, the peak stress and hence resistance to fatigue and fracture can be determined.

One problem with Timoshenko beam models is that the decision on what shaft steps to include and exclude is down to the engineer creating the model. There is a temptation for the engineer to include all the shaft steps, with the idea that including all the features will be more accurate since the shaft model looks more like the physical object. This is computationally expensive, but more importantly it may be inaccurate since, as the aspect ratio of a Timoshenko beam becomes higher (bigger diameter to length ratio), the accuracy decreases. Thus, a more detailed definition of the form may be less accurate.

An alternative approach is to use 3D Finite Elements, where the volume of the 3D geometry is occupied by finite elements which form a continuous mesh. At the corners (for low order elements) and corners and edges (for high order elements) of each element is a node, at which results for deflection and stress can be derived. The greater the number of nodes, the greater the fidelity of the results.

Timoshenko beams are commonly used in Application Specific packages because of the high productivity that they permit for the gearbox design process. Their properties depend on the diameter, length and bore of each shaft section, which can be defined parametrically or, as has been described, approximated from the importing of a 2D shaft profile from a sketch or CAD drawing.

However, if it is determined that 3D Finite Elements are required to gain the appropriate level of detail for the results, the same laborious process has to be undertaken, of linking the MBD or Application Specific package with CAD, FE pre-processors, FE solvers (twice) and specific Fatigue Simulation package.

As has been described before, once the engineer decides to make this change in model construction the potential for gearbox design modification is substantially reduced, and this change in modelling approach is not reversible since you cannot obtain a 1D (Timoshenko beam) model from a 3D Finite Element definition of the shaft.

3D finite element meshes use different element types. Hexahedral (hex) elements have 6 sides, 8 corners and 12 edges. Thus a low order element has 8 nodes and a high order element 20 nodes. Tetrahedral (Tet) elements have 4 sides, 4 corners and 6 edges. Thus a low order element has 4 nodes and a high order element 10 nodes. More elements typically give greater accuracy, but the computation time increases.

In all cases high order elements are more accurate than low order elements, but the analysis times are longer. Hex elements are significantly more accurate than Tet elements for the same number of nodes, so they have the advantage in delivering a good balance between accuracy and computation time. However, each mesh needs to be continuous, whereby the corner of one element coincides with the corner of the adjacent element. Due to the nature of topology, any arbitrary 3D volume can be filled with a mesh of tet elements, whereas a hex mesh suffers from continuity problems. Because of this, the last 20 years have seen tet elements take over from hex elements as the dominant element for analysis, with FE packages taking an arbitrary 3D volume and automatically meshing the volume with tet meshes. The limitations of accuracy of tet elements are mitigated by the introduction of increasingly fine meshes. While this works in principal, the practice means that solution times become very much longer.

Another aspect of 3D meshes is that the mesh requirements are different depending on what analysis is being carried out. A stiffness calculation requires a much coarser mesh than one for stress. For dynamic analysis the mesh density is dependent on the maximum frequency of interest. This is because, for a given linear, isotropic solid, the velocity of vibration is fixed by the density and Young's Modulus. Thus a higher frequency has a shorter wavelength. For a vibration to be represented accurately, sufficient elements are required to define its wavelength, therefore a higher frequency vibration, with shorter wavelengths, needs a finer mesh, more elements and greater computation time and capacity.

The result is that there is a plethora of different processes for analysing structural behaviour, with different engineers using different tools and approaches, even if they are in the same company. There is a lack of standardisation, and results for the same analytical problem differ depending on the judgment and experience of the engineer carrying out the work.

Some companies try to overcome this problem by having a "single, standard mesh", which is quality controlled and subject to version control procedures. The problem is that this mesh needs to be sufficiently precise for the most precise calculation for which it might be used, meaning that it is excessively precise for all the other calculations. This can slow down data processing times for the analyses where a lower level of precision is sufficient.

Further, a high level of mesh density may be necessary in one area but not another. For example, the stress at a fillet radius in a shaft may be of concern at one location on the shaft, and the resulting high mesh density will be extended, through continuity, to the rest of the shaft and maybe to the rest of the driveline, where such a high level of precision may not be necessary.

A third approach of modelling shafts is using shell FE elements. This may be appropriate where the shaft section is very thin, or where the shaft becomes a flange, with a very large change in section over a very small axial distance. In the latter case (common in a conventional passenger car automatic transmission), a Timoshenko beam becomes inaccurate since it assumes that all points at a given axial location move with the same motion. The limitation of this is that the shell elements may not be appropriate for all parts of the shaft, and manual intervention is needed to define and manage the transition between shell and 3D finite elements, a procedure which is slow and open to interpretation, judgment and variability.

The 3D mesh is normally created by importing the solid geometry of the component of interest, from CAD, and the volume is filled with a suitable mesh in a Finite Element package. The link between design (CAD) and analysis (FEA) is slowly being improved, with closer links and semi-automation. The idea is that the engineer can change the geometry of a design (a function of a CAD package) and the analysis model (FE mesh) is updated automatically, thus making the design-analysis-redesign iteration as quick as possible.

However, these functions exist in generalist packages, which have no specialist guidance or processes for the analysis of driveline systems. The FE meshes are created without reference to how the driveline is to be analysed and the simulation model into which mesh has to be assembled has to be defined manually. In addition, the whole of the FE mesh is redefined even when the change may have been quite local.

As has been said, such automesh functions are generally based around tet meshes. In addition to being comparatively inaccurate and slow for analysis, these meshes have additional limitations with regard to the analysis of drivelines. Certain features, loads and boundary conditions run parallel to the axis of a driveline shaft and certain features run circumferential to the axis of the driveline shaft.

Features that run parallel to the axis include splines, axial holes and the line of contact of a roller bearing. Features that run circumferential to the axis include changes in shaft sections, fillet radii and contact with roller bearing raceways and gear blanks.

The axis of the shaft is perpendicular to all lines that run circumferentially around the axis. Every face on a hex element is a quadrilateral, so in its simplest, undistorted form it can have one side running parallel to the axis and the adjacent, perpendicular side running circumferentially around the axis. In comparison every face on a tet element is a triangle. Thus it is possible to create a mesh on a driveline shaft using hex elements with much greater efficiency and with less distortion of the elements. A high degree of symmetry can be achieved, since roller bearings rollers, spline teeth, gear teeth etc. repeat rotationally, and the mesh can be created with a high degree of control, so that there is high mesh density where precision is required, and lower density elsewhere.

Whatever element types are used, "seed nodes" are often used. These are pre-defined locations at which the engineer requires there to be nodes or a minimum mesh density, for example areas of key stress or locations where deflection or analysis results are required. These are defined prior to automeshing and the automesh will incorporate these nodes into the continuous mesh of the component.

Again, in drivelines it is common for these seed nodes to run in groups either parallel or circumferential to the driveline shaft, and so can be most efficiently incorporated into a hex mesh.

It is possible to see hex based meshes for driveline shafts in published literature, however they are predominantly for hollow shafts, since packages struggle to maintain mesh continuity through to the centre of solid shafts. Thus, no generalised hex automesher for driveline shafts exists, and engineers are required to accept one or more of the short comings identified.

(6) Different Ways of Setting Up Models—Bearings

The function of a rolling element bearing (including all types of ball and roller bearings) is to support a shaft and allow it to rotate. Thus, the simplest mathematical representation of a bearing within a gearbox system is that of a simple support, with infinite radial stiffness and zero tilt stiffness.

In reality, rolling element bearings have finite radial and tilt stiffnesses, and in many cases axial stiffness too. As has been stated, the actual flexibility of rolling element bearings is important is determining the deflection of the gearbox system and the loads (and hence stress and durability) of housings, planet carriers etc. Being the most widely used analysis approach for mechanical load, deflection and stress, it is possible to use Finite Element methods to calculate the loadsharing among the rolling elements and the deflection at each contact. However, the stiffness of each contact depends on the size of the contact patch which depends upon the magnitude of the load, so an iterative calculation is required. This calculation is slow in FE and the iteration is not guaranteed to converge on a stable solution.

The common approach, as has been taken up by various Application Specific packages, is to develop specific analysis routines for rolling element bearings whereby each contact is modelled as a Hertzian contacting element between two conformal surfaces which are defined parametrically. This approach is vastly quicker than using FE, makes convergence much easier and is actually more accurate.

In doing so, the loadsharing between the rolling elements can be calculated taking account of the radial internal clearance, pre-load, shaft misalignment and combination of axial, radial and tilt loading and deflections. As well as important for the calculation of loads on the housings and planet carriers, this is essential for calculating the stress and hence life of the bearing. It also impacts upon the operating misalignment of the gears, which affects gear durability, noise and efficiency.

The problem with this approach is that the raceway is assumed to be a rigid ring. Thus, even though the loading on the rolling elements is determined to be unequal, this unequal load does not cause deformation of the bearing race way. There are limitations in the accuracy of the calculation of the loadsharing among the rolling elements and hence life of the bearing.

Deformation of the bearing raceway can have other effects. An out of round raceway leads to a modified stress field within the housing which changes the housing durability, and hence omission of this influence is an inaccuracy. The same applies to loading, stress and durability of a shaft.

3D Finite Element models of the complete gearbox can be built up consisting of shafts, bearings, gears, clutches, differentials, housings etc. and used for structural, thermal, stress and dynamic analysis. The problem with dynamic analysis is that Finite Element models of the housing are rarely accurate above 5 kHz, which leaves large areas of the audible spectrum vulnerable to inaccurate analysis. This is because at high frequencies, the mode shapes are localised and their wavelengths are comparable with dimensions of the small geometrical features. These localized and small geometrical features are quite sensitive to manufacturing errors. This is the reason why FE models are not accurate at high frequencies.

Alternative methods for calculation of natural frequency are possible, including closed form analytical solutions and Statistical Energy Analysis. Analytical approaches can be used for structures that are axi-symmetric, or 2D, or planar etc., but in reality gearbox structures, and especially the housings, are none of these. Statistical Energy Analysis is of greater use at high frequencies, but CAE packages have evolved on the assumption that Finite Element Analysis and Multi-Body Dynamic Analysis (which can involve aspects of FEA) are the standard, default approach.

The picture emerging is one where there are many different, disparate packages being used by different engineers, potentially in different departments or companies, obtaining results for different analyses. The way that the simulations are set up is open to interpretation, thus quality control is a problem. There is a temptation to add complexity to a simulation just in case it is needed, with the belief that the more complex it is the more accurate the result.

This leads to the following problems. The modelling process is slow since the simulation takes a long time to set up. Such complexity requires an expert user to be able to set up the simulation, which is expensive and may lead to resource constraints.

One major disadvantage of a complicated model comes from the psychology behind decision making. The simulation is made and the engineer studies the results, looking for (i) whether the results make sense, to check that the results are correct (ii) what guidance the results give regarding what to do with the design, to make the design better. Without these two steps, no matter how capable the simulation is, it counts for nothing. If the results do not make sense they will be disregarded, if they do not give guidance as to what to do with the design they do not impact on the product. Making the simulation more complex, which is always a temptation with increasing computer power and more sophisticated software, makes both of these outcomes more likely.

Complex simulations have another disadvantage, in that some of the data required to get the result is not available until near the end of the design process. Yet the result is required to determine if the design is fit for purpose.

So far, the discussion has been about the subjects of static deflection, durability and dynamics. Other aspects of performance also need to be simulated—cost, thermal, driveability, efficiency and gear shift control. All of these have other ways of being simulated and, again, there is the danger that simulations will be set up in different packages (for example, Computational Fluid Dynamics for efficiency, Multi-domain simulation packages for gear shift control, Multi-Body Dynamics for driveability) by different departments or companies.

The process of data update when a design change is made is slow and error-prone, and as the number of different simulation tools increases, this problem becomes worse. An engineer cannot efficiently assess the impact of a design change. For example, changing the pressure angle of the gear changes the gear stress (Application Specific Package of Specialist Component Package), bearing load (Application Specific Package of another Specialist Component Package) driveline static deflections (FEA or Application Specific Package), gear whine (FEA), gear rattle (MBD) and efficiency (CFD). The whole design process of design and simulation becomes slow compared to the need for rapid product development.

(7) Export from Application Specific Package

Some attempts were made to automate the process of transferring data from Application Specific Packages to CAD, for example by exporting solid geometry. However, such geometry was normally exported in the form of "dumb" geometry, such as STEP or IGES, which cannot be used for the parametric modelling which is a standard function of modern CAD packages.

An alternative approach to Parametric Modelling in CAD is Direct Modelling. In this, the STEP or IGES definition of a component can be directly manipulated and dimensions changed, although the model of the resulting component is dumb and transfer back to a Parametric definition is not possible.

For certain components, the geometry is not easily defined or the relevant data for manufacturing is defined parametrically. For gears, the precise shape of the root fillet is dependent on the complex kinematic relationship between the gear cutting tool, the gear blank into which the gear is being cut and the cutting machine. This relationship is not known to most designers of gears and gearbox systems, so a simplified geometric representation of the root fillet is used in the CAD definition of gears.

The problem with this is that the precise shape of the root is required if generalist analysis packages such as Finite Element Analysis is to be used to calculate the root stress. In the absence of such data, the gear designer estimates the shape of the root and the analyst ends up with an incorrect stress value.

The active flank of a gear is also a complex shape. Most gears are involute gears, the involute form being the form which most efficiently transmits constant motion between two axes. Whatever the shape of the geometry in the CAD file, the gear manufacturer refers to fundamental parameters such as base pitch, base diameter, module, helix angle, pressure angle, profile shift coefficient. These data are listed in a table that appears on the gear drawing and it is these values that define the gear's performance most effectively. Naturally, the Application Specific Package (or Specialist Component Package) defines the gear in terms of its fundamental parameters since it allows the behaviour of the gear to be analysed using industry-standard methods such as gear rating etc.

The problem with the parametric definition of gears is that these data need to be transferred to the CAD definition, which ends up being a process of transcription. This is time consuming and prone to errors. Further, if there is a design update then the process needs to be repeated.

BRIEF DESCRIPTION OF THE INVENTION

The invention describes an approach for managing and coordinating the data in the design of driveline systems so that the most accurate and informative insight on the driveline's performance is delivered to the engineer at the earliest possible point in the design process, hence product design and optimisation can be carried out as quickly and efficiently as possible. More aspects of product performance are coordinated together and the engineering insight is greater, hence the methodology becomes a platform for making engineering decisions rather than mathematical simulation.

According to one aspect, the present invention is directed to a computer aided engineering system comprising a data input module, a user-interface module, a recognition module and an analysis module.

According to another aspect, the present invention is a computer-implemented method of computer aided engineering for producing a design for a rotating machine assembly. It comprises the steps of providing data relating to one or more components of the rotating machine assembly; receiving from a user a type of analysis to be performed on the data; selecting features of the data be used for the analysis according to the type of analysis selected; and analysing a performance of the rotating machine assembly according to the type of analysis selected.

DETAILED DESCRIPTION OF THE INVENTION

Figure 1:
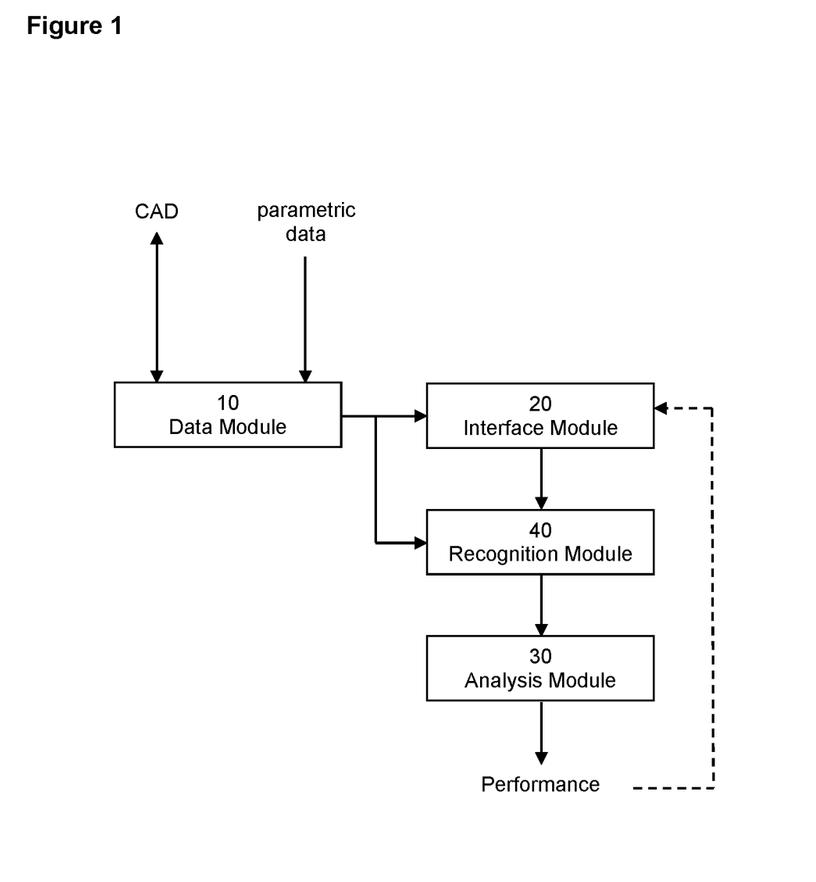
FIG. 1 shows a schematic of a computer aided engineering system.

Referring now to FIG. 1, which shows a schematic of a computer aided engineering system of the present invention, data relating to one or more components of the rotating machine assembly are provided to data module 10. In one embodiment, this data can be CAD data, which recognises that CAD has a significant role in the design of driveline systems. A driveline design may start its life in CAD and certainly the final drawing of the components, prior to manufacture, will be in CAD. Libraries of drivelines, their sub-systems and components, exist for old products and these are a valuable data source of data. Data module 10 may also receive or contain, for example in a database, data relating to the one or more components of the rotating machine assembly. The data may be, for example, be in the form of solid geometry for the housing or planet carrier. Typically the CAD solid geometry is for generalised shapes including housings, planet carriers, or differential cages. This may be obtained from a proprietary 3D CAD package, in which case the geometry is imported into data module 10. The data may also be in the form of parametric description, comprising data relating to form, function, properties and operating conditions of the rotating machine assembly. The data held in data module 10 is or becomes a single source of data describing the form, function, properties and operating conditions. This is in effect where the design is created through multiple iterations through the system.

Data module 10 can receive further data relating to other components (shafts, bearings, gears etc.). As mentioned above, previous approaches have used an approximation approach to import a 2D shaft profile from a sketch or CAD drawing; data module 10 is configured to import CAD profiles of shafts. Data module 10 communicates with a user interface 12 which allows a user to control the data flow into the data module, and also to position the other components relative to the imported solid geometry.

In an analysis module 30 the invention integrates a FE model of the one or more components into a system model for analysis of deflection, dynamics, stress and fatigue. However, rather than relying on several different packages for different steps in the process, involving different engineers who may be in different departments, all the necessary tools are in the system of the invention. This is particularly beneficial for non-axi-symmetric components such as housings, planet carriers and differential cages. Thus once the solid geometry has been imported from CAD and further data relating to other components (shafts, bearings, gears etc.) has been imported and positioned, a suitable 3D mesh can be created there and then by analysis module 30.

The 3D mesh can be connected to the other shafts, bearings and gears, and the process of condensation again takes place in the same system. Analysis for static deflection is carried out straightaway by analysis module 30, where the flexibility of the housing interacts with the non-linear stiffness of the bearings, the shaft deflections etc. to and an analysis of the performance of the rotating machine assembly calculates the static deflections.

This can be used for analysing a performance of the bearing life, gear life and noise, and also the loads are applied to the housing or planet carrier for calculation of the detailed stress. Again, this takes place within the same system. Similarly, analysing a performance in terms of fatigue housing can be made.

The approach disclosed above relies, for example, on the housing design having been created in a separate 3D CAD package. Whilst this is common, and is acceptable for final design checks or for analysing old gearbox designs, it is not satisfactory for the concept design of, for example, gearboxes, since the process of going to separate professional functions (CAD engineer, FE engineer) and separate software tools (CAD, FE pre-processors and solvers) is too slow for practical design timescales. The result is that the influence of the housing or planet carrier stiffness is ignored in the concept design phases.

The system of the present invention integrates all the processes necessary for analysing the performance including the influence of the housing and planet carrier on the gearbox design at the concept stage. Since multiple functions are included, when a mathematical model of each function is created only the information that is relevant to that function should be extracted from the data. This is what recognition module 40 does. CAD does not understand how it functions so it cannot recognise the contribution of each feature to the function.

For example, the one or more components comprise gearbox internal components and the data to be received by data module 10 comprises a user-defined wall thickness and clearance from the rotating components, and wherein analysis module 30 creates a housing that wraps around the rotating components. Analysis module 30 comprises an Application Specific package, and the user is able to create a solid geometry "wrap around", with a user-defined wall thickness and with a user-defined clearance from the rotating components. This is achieved by a recognition module 40 that contains a database of functional features of rotating machine components and their connections; it parses the data held in data module 10 to identify features contained within its own database of features. This means that by "understanding" the functional behaviour of the gearbox, the package recognises the bearing outer rings, and recognises that these need to be supported by the housing. Recognition module 40 recognises this and creates a supporting cylinder that wraps around the bearing outer race, with length equal to the bearing width, inner diameter equal to the bearing outer diameter and user-defined outer diameter. This cylinder is integrated into the housing structure.

Thus, in a short space of time, the user or engineer has created a functional housing with which he/she can start to investigate its effect on the internal components.

Analysis module 30 includes the function to mesh the solid geometry, with no need to transfer data to another package. The functions within analysis module 30 are configured for the benefit of gearbox engineering, as opposed to generalised Finite Element analysis, as would be the case in an FE pre-processor, hence the process can be managed by an engineer who is not expert in FE tools, thus eliminating the need to involve a separate professional function or functional department.

The connections between the housing and the internal components (normally through the bearing outer rings, but also possibly through ring gears and clutches) are identified automatically by recognition module 40 parsing/modifying the parametric definition of the evolving design held in data module 40. Next, the process of condensing the housing FE model is performed by the analysis module 30 using the data in data module 10; again this is performed in the same system and without the need to involve a separate software tool, professional function or functional department.

It is likely at this stage that the housing definition will be suitable for analysing a performance of the rotating machine assembly, for example reporting static deflections and NVH calculations. It is to be noted that certain performance criteria are not amenable for analysis at this stage. These performance criteria include, for example, stress calculations, which require a more data defining a detailed model of the housing with fillet radii defined. This analysis would follow on later, at the detailed design stage.

Nonetheless, the impact of the housing stiffness on the loading, misalignment, stress and hence life of the bearings, and on the misalignment, noise, stress and hence life of the gears, are all included at a much earlier stage in the gearbox design process than is currently possible.

A similar process can be carried out for planet carriers. In any planetary gear system the stiffness of the planet carrier plays a crucial role since it governs the load sharing between the planets and hence the load carrying capacity of the planetary gear set as a whole. In the absence of any such information, the design engineer has to rely on empirical data or estimates as to this effect during the concept design stage when the size of the planetary gear set is being determined. The result is increased risk to the project. Once the engineer has created or specified a design of the planet gear set, with the gears, planet pins and planet bearings defined, the step to define the planet carrier is taken, and this involves recognition module 40 identifying the gear set components and how they interact with the planet carrier, as disclosed above for the housing creation.

With the solid model of the planet carrier defined, the FE mesh is created within the package and without having to involve a separate software tool, professional function or functional department. The FE model of the planet carrier is connected to the planet pins and then the process of condensing the FE model is carried out in the same package.

In carrying out the static analysis of the gearbox system, the effect of the planet carrier stiffness is included in the planet load sharing calculation. This is essential to determine the maximum load on any of the planets and hence if the planetary gear set is fit for purpose in terms of load carrying capacity.

The process can be carried out rapidly within the same package and by the same engineer. This is in contrast to the conventional approach which, as has been stated by a major automotive manufacturer, involves a process of 2 months and 3 departments.

Thus the design engineer can investigate the difference between 3-planet and 4-planet designs with ease, a design study that simply cannot be carried out with conventional tools with the time constraints of real-life design projects.

The design of the driveline rotating machine assembly can at any stage be exported from the system of the present invention.

When dealing with gears, the transfer of data from the Application Specific Package to the CAD is in the form of direct data transfer, where the numerical value of the fundamental parameter is transferred into the CAD package and inserted into the relevant table. This makes the process faster and less error prone. Further, if the gear design is updated the CAD definition can be updated once more.

Within the Application Specific Package, the definition of the gear cutting tool and the manufacturing process is defined in sufficient detail that the detailed shape of the root fillet can be calculated, through the means of a detailed kinematic simulation. Rather than have this detailed kinematic simulation take place in the CAD package, the Specialist package outputs a "template" profile of the root fillet, which can be read by the CAD package and which can be used, through the process of extrusion, to create the solid geometry of the root fillet. This interaction becomes a process which integrates two essential tools and creates and workflow for data through the design process.

When shafts are imported from CAD, the invention accesses the CAD data directly and thus the geometry is imported with the exact dimensions. This is better than the approximate values obtained by other methods such as scanning 2D drawings.

Such data can be read in not just from the CAD models of shafts, but from assemblies of different components (shafts, bearings gears). Recognition module 40 recognises the shaft for its role in the gearbox and associates the relevant functional properties.

Further, in reading in the data from an assembly, the recognition module can recognise the mounting of various components in the shaft, such as gears and bearings. The creation of a functional definition of the driveline is accelerated since much of the information is already derived.

When the geometry of the shaft is imported, the data is conditioned according to the needs and wishes of the engineer. Fillet radii, grooves, short sections, chamfers and keyways are examples of features that are important for stress but insignificant for stiffness and dynamics. Recognition module 40 is able to automatically identify small features and allows the engineer to decide, via user interface 20, if they are to be retained, based on the type of analysis to be carried out.

An option exists for this process to be automated, whereby the engineer selects the type of analysis that is to be carried out by the analysis module 30 and recognition module 40 automatically removes those features that are insignificant to that analysis.

With dynamic analysis, this step is taken further. The features that need to be retained are dependent on the frequency of analysis that is necessary for the given dynamic phenomenon.

The engineer will input the highest frequency required and the fidelity of the imported model will be adjusted accordingly by recognition module 40.

The processing of this data depends on the element type being used to represent the shaft. As has been stated, Timonshenko beams are useful since they are parametrically defined by inner diameter, outer diameter and length, and thus can be easily modified.

If the engineer selects to represent the shaft using Timoshenko beams, recognition module 40 shaft will automatically identify which sections are so short that such a representation would be inaccurate. Again, the invention provides the facility for the engineer to accept/reject this advice, and for the decision to be made automatically, via user interface module 20.

However, the invention also identifies if other element types may be more appropriate. For example, if a section has a larger change in section or is a thin section, the invention can suggest that 2D shell elements are suitable. Again, the invention provides the facility for the engineer to accept/reject this advice, and for the decision to be made automatically.

The engineer may choose, via user interface 20, to have the shaft modelled by analysis module 30 using 2D shell or 3D elements. The conventional approach is to import an FE mesh from a separate package. However, as has been illustrated for housings and planet carriers, in the invention the function exists for creating the FE mesh, connecting the FE mesh to the gears and bearings and condensing the FE model, all within the same package.

Thus, any influences that arise from the detailed structural behaviour of the shaft can be included early in the design process in a way that is not possible using conventional tools and within the time constraints of practical design projects.

Examples include the out-of-plane bending that occurs when a helical gear is mounted on a thin shaft section. If this section is modelled as a Timoshenko beam it does not recognise the fact that the axial component of the gear load will cause the shaft section to bend in a way that affects the gear mesh misalignment. Gear mesh misalignment affects gear noise and stress and hence life. This can only be captured by a 3D finite element model. The invention allows this affect to be considered early in the design process in a way that is not possible using conventional tools.

In a conventional automatic transmission, many of the shafts are thin structures which are suitable for 2D shell elements and onto which are mounted planetary ring gears (also known as annuli). As the ring gear is loaded at discrete points due to the gear meshes with the planets, it goes out of round. However, a Timoshenko beam representation of the shaft assumes the shaft remains round, thus incorrectly over-constraining the ring gear and giving incorrect results for planetary load sharing and gear mesh misalignment. The invention allows this insight to become available to the gearbox engineer during the early design stages for the first time.

If 3D elements are selected, the mesh density and mesh structure is defined according to the analysis required. For example, if stiffness or dynamic analysis, but not stress analysis, is required, the fillet radius at a change in section can be ignored and the mesh constructed so that there is a sharp, 90-degree corner at the change in section.

If stress analysis is required, the mesh has to be constructed so that there is a smooth, continuous mesh around the fillet radius, with the correct geometry, so as to calculate the stress. The invention provides the facility for the engineer to define, via user interface module 20, the number and location of seed nodes to be located around this fillet radius; Alternatively, recognition module 40 comprises pre-defined settings to achieve suitable accuracy in the stress calculation performed by analysis module 40 and will apply the appropriate mesh density automatically.

In this invention, the mesh structure and element type does not need to be the same for all shafts in the same driveline. It is possible for one shaft to be modelled using Timoshenko beams with another shaft modelled using 3D Finite Elements for the purposes of detailed stress calculation.

The invention goes further in that the mesh density, mesh structure and element type does not need to be constant throughout the structure of each given shaft. It is possible that a shaft could be most efficiently modelled with 3D finite elements in one area (for detailed stress analysis), 2D shell elements in another area (due to the shaft structure) and Timoshenko beams in another area. Thus a "hybrid" definition of the shaft is created, as shown in FIG. ** (include Sharad's diagram). The invention automatically handles the transition from one element type to another in setting up the model and in the analysis.

The transition between a Timoshenko beam and 3D finite elements takes place at a suitable shaft section, with a change in section that is perpendicular to the shaft axis. During the analysis, the displacements (3 directions) and rotation (around 3 axes) is maintained to be constant for all nodes located at this change in section.

The transition between a Timoshenko beam and 2D shell elements can take place at a suitable shaft section, with a change in section that is perpendicular to the shaft axis. Again, during the analysis, the displacements (3 directions) and rotation (around 3 axes) is maintained to be constant for all nodes located at this change in section.

The transition between a Timoshenko beam and 2D shell elements can take place where there is a substantial change in section. Effectively, a ring of nodes are located at the outer diameter of the Timoshenko beam at this shaft section. During the analysis, the displacements (3 directions) and rotation (around 3 axes) is maintained to be constant for all nodes located at this change in section.

The transition between a 3D finite element and 2D shell elements can take place at any location. The treatment of links between such elements is reasonably common and well known in finite element practice. At the interface, each node is located on the side or the corner of both a 3D and a 2D finite element. Therefore, the displacements (3 directions) and rotation (around 3 axes) is the same for both elements at this location and the mesh has the correct mechanical properties.

The use of 3D and 2D shell elements for shafts, bearings and gears makes the system suitable for Computational Fluid Dynamics too. In this instance, only the surface of the components is used to make the mesh, which is used in the simulation to predict oil flow and drag due to windage and oil churning.

As has been described, in its simplest form a bearing exists as a (i) simple radial support. Other options include (ii) a simple support with axial constraints and contact angles corresponding to the bearing type, and (iii) a bearing model with Hertzian contact elements and rigid inner and outer raceways.

However, in all of these versions the inner and outer raceways are assumed to be rigid. In practice, as load is applied to the bearing uneven loading of the rolling elements cause the raceways to go out of round. Flexibility of the raceways alters the maximum load on the rollers hence the stress and bearing life, yet conventional tools do not allow this to be taken into account.

Using the same FE meshing tools as for the housings, planet carriers and shafts, an FE model of the outer race is created and connections are made to each of the rolling elements and their Hertzian contact models. Condensation of the FE model takes place in order for the static analysis of the system to take place, this time with the loadsharing among the elements correctly accounting for raceway flexibility.

In a final innovation, there is the option for each of the rollers to be modelled using 3D Finite Elements. This is provided so as to give the user maximum insight into the contact conditions and to provide results that are compatible with generalised 3D FE tools. Again, greater insight into the behaviour of the bearing is provided than is possible with conventional tools.

(iv) a bearing model with Hertzian contact elements and flexible inner and outer raceways and (v) a finite element bearing model with flexible rollers, contact stiffness and flexible inner and outer raceways. In versions (i) to (iii), the bearing connects to shaft through a single node, at its mid-point. In versions (iv) and (v), the bearing has a The connection that the bearing provides to the shaft depends upon how it is modelled. In versions (i) to (iii), the bearing connects to shaft through a single node, at its mid-point. In versions (iv) and (v), the bearing has a bearing inner ring which is modelled in 3D finite elements, with numerous nodes around the bore of the inner ring.

The way the shaft model is set up depends upon the connections to other components such as bearings, and the nature of the model for the bearing. 5 different bearing models have been described, with different levels of fidelity In all these 5 versions, the connection between the bearing and the Timoshenko beam is through a single node at the centre of the bearing. Where there is a flexible bearing inner ring with an FE definition, this node is constrained to move with all of the nodes on the inner surface of the bearing inner ring at this given axial location, for example through the use of RBE2 or RBE3 elements.

Where the shaft is modelled as shell or 3D finite elements, the connection to the single node of bearing versions (i) to (iii) is made by constraining this bearing node to move with all of the nodes on the outer surface of the shaft at this given axial location, for example through the use of RBE2 or RBE3 elements.

Note that the use of hex elements in 3D model makes it very efficient to create a mesh which can connect to a bearing. Once the shaft geometry and the bearing location are known, the process automatically sets up the shaft mesh with nodes located at the correct location and with the correct mesh density.

Where the shaft is modelled as shell or 3D finite elements, the connection to bearing versions (iv) and (v) is made through mesh continuity. Both the shaft and the bearing ring have elements with quadrilateral faces at the mating surface, so mesh continuity, with coincident nodes on the shaft and the bearing ring, can be achieved easily. The hex mesh in the shaft sets up the lines of modes that run circumferential to the shaft axis, to match the contact either side of the bearing inner ring and the central ring of nodes for the RBE2 and RBE3 elements, and the line of nodes necessary to contact with the roller bearing roller elements. This process is automatic and creates a highly efficient and accurate mesh.

Further, it is easily segmented, so that a change in the geometry at one part of the model does not require complete remeshing. This is especially the case when a "hybrid" model of a shaft is created. The shaft diameter of a Timoshenko beam can be changed in one part of the shaft and the effect of this change on the detailed stress at another part of the shaft (modelled in 3D Finite Elements) can be assessed without any remeshing.

The above approach also works when the bearing outer race is located into a shaft, for example with a pocket (also known as a spigot or pilot) bearing.

The properties of a gear within a mathematical model can also have a spectrum of definitions, each with varying levels of fidelity. In many cases, the gear loads are applied to the supporting shaft at the centre of the face of the gear. The connection between the gear and a shaft section modelled as a Timoshenko beam is simply one where there are two coincident nodes which are mathematically connected.

Where the shaft is modelled as a 2D or 3D FE model, the node at the centre of the gear is constrained to move with all of the nodes on the outer surface of the shaft at this given axial location, for example through the use of RBE2 or RBE3 elements.

Where the gear is modelled with a 3D FE mesh, the gear blank can be either integral with the shaft, in which case it is treated as being part of the shaft (with the hex mesh delivering continuity of mesh), or it is mounted on the shaft, in which case the connection between the gear blank and the shaft is treated in the same way as between the shaft and the bearing raceway, described previously.

In a further innovation, all the above methods can be used to simulate the effect of interference fit in a driveline, for example, between a bearing raceway and a shaft or a gear blank and a shaft. Timoshenko beams may be used for the shaft, in which case analytical models can be used to calculate the effect of the interference fit. Alternatively, using 3D FE models of the shaft, bearings and gears, highly complex analysis of the stresses and deflections at each node, plus its effect on the rest of the system, can be calculated. The analytical method can deliver results quickly but has limitations, for example if the bore of the shaft changes mid-way along the section for which the interference fit is being calculated, this cannot be calculated. The 3D FE approach delivers results for the more complex geometry but runs more slowly. Again, the combination of the two in the same CAE package delivers a direct route to engineering insight, decision making and design optimisation.

The overall process has great flexibility. For example, the gear can be mounted on to a bearing outer race, whose inner race is connected to a shaft. The gear, shaft and bearing can have different levels of fidelity in terms of their representation in the mathematical model. In each case, all levels of fidelity can be utilised with any other level of fidelity of the other components. In all cases the levels of fidelity can be increased or decreased without the need for redefinition of the driveline. In all cases, the process provides recommended values of the level of fidelity, depending on the analysis being attempted. In all cases, once the level of fidelity has been selected, any change to the form of any of the components (in CAD) automatically leads to the mathematical models being updated for any of the performance criteria that are under study. At all times, the user can select a different level of fidelity for any component or group of components.

Correspondingly, all the major shortcomings of conventional CAE systems fall away. Multiple performance criteria can be studied with a single driveline definition, so that when a change to the driveline design is made, the mathematical models of all the failure modes are automatically updated, without need for definition or user intervention.

At the same time, all the mathematical models are precisely fit for purpose, so that they do not contain excessive or insufficient levels of fidelity for the required simulation.

Further benefits come from interpretability. A highly complex mathematical model of the driveline is possible, with each component modelled to the highest level of fidelity. However, the results from simulation of such a model may well be counter-intuitive at first sight. The engineer is able to selectively reduce the level of fidelity of each component, back to something that can be easily understood or checked by hand calculations. As each level of complexity is added/removed, the engineer gains insight into what influences cause the results to deviate from intuition. The engineer can check that the driveline definition is free of errors, and can gain an unmatched understanding of the influences that affect the results of complex simulations. This assists in decision making, leading to better products and more efficient economic activity.

So far, the system has been described for rotationally symmetrical components such as shafts, bearings, gears, splines etc. Other components, commonly used, have rotational asymmetry and so different treatments are required. Examples include differential cages (in automotive applications) and planet carriers (in a wide range of applications). In particular, the planet carrier has a strong influence on the behaviour of drivelines containing planetary gears, yet in many cases engineers make the assumption that it is rigid, up to the point where the design is so near to completion that meaningful design changes are not possible.

In this invention, a simple representation of the planet carrier can be achieved, either through direct modelling or a solid model that is controlled by a handful of parameters. Details such as fillet radii are omitted, but this is sufficient for analysis for CFD, static deflection, stiffness and all dynamic influences. Thus, the influence of the planet carrier on all aspects of performance of the gears and bearings that it supports are included.

For such a definition of the planet carrier, it is once again possible to hex automesh the planet carrier, complete with levels of mesh density suitable for the analysis being carried out and for the relevant interfaces to the components that it interacts with. All the principles of the analysis of multiple performance criteria, scanning back and forth across the differing levels of fidelity, and automatic model updates, hold true.

The behaviour of differential cages can be treated in the same way as for planet carriers.

The final part of the picture comes with the treatment of the housing of the driveline. In this case, the geometry is highly variable and no hex automesh is possible. Thus, it is common/expected that a tet automesh can be used.

Once again, the invention provides for the housing to be included within the analysis of the full driveline for different performance criteria, for multiple levels of complexity and fidelity to be used and for automatic updating of mathematical models.

The housing normally supports the outer ring of the bearing, which can have a range of different definitions. As with the connection between the bearing inner ring and the shaft, if the outer ring is rigid, its single analytical node is constrained to move with all of the nodes on the inner surface of the housing close to this given axial location, for example through the use of RBE2 or RBE3 elements.

However, if the bearing outer ring is defined using 3D hex elements there is a discontinuity of mesh as the mesh moves from one element type to the next. However, in modern FE packages (e.g. Nastran) the continuity between two non-conformal meshes can be approximated by assuming these contacting surfaces to be "welded" together, and this approximation is used here. The benefit of this is that the influence of the housing design can be integrated into the flexible, multi-analysis and multi-fidelity process for design-analysis-redesign of driveline systems, described here.

For dynamic analysis, the multi-fidelity approach is extended by providing options in the form of (i) analytical methods, (ii) Finite Element Analysis and (iii) Statistical Energy Analysis within the same package. Analytical methods are accurate for simple structures (planar sections, 2D shapes, axisymmetric sections) but are not accurate for complex 3D structures. Nonetheless, when used in combination with 3D dynamic analysis in the same package a design methodology arises that allows optimisation of system performance in a way that is not possible using one of these methods in isolation.

Within the housing, typically areas of housing with a consistent thickness are interspersed with ribs which increase the structural stiffness. The danger is that if the ribs are too far apart, the space in between becomes a "panel" which resonates and radiates noise. Many use 3D Finite Element analysis to model the system, calculate modal frequencies and forced response etc. However, it is possible to interrogate the dimensions of the panel and suggest, through closed-form analytical solutions, the resonant frequency of such a panel. If this frequency is too low, then the engineer can immediately increase the wall thickness or reduce the gap between ribs. The success of this approach can be confirmed in the same package, through the use of 3D FEA of the whole structure.

The limitations of frequency with FEA fall away when SEA is combined in the same package. Often a system has some frequencies of vibration in the range that is suitable for FEA, whilst others are above this. The invention provides for both FEA and SEA to be used in the prediction of dynamic behaviour. The selection of which method to use is suggested by the package, based on the analysis of excitation, but can also be selected by the engineer.

The use of SEA has another advantage. The dynamic behaviour of a housing can be calculated using Statistical Energy Analysis (SEA), and this is dependent not on the detailed design of the housing but on the overall shape of the housing. Thus, so long as there is a driveline design with a housing of similar shape and size, SEA of the housing allows its influence to be extracted and included at the earliest stages of the concept design. This way, data from an existing, but similar driveline housing can be used in the concept design of a new driveline in place of the actual housing of the new driveline, which is yet to be created.

Thus the invention provides the opportunity for "data mining" of past designs in order to optimise the process of creating new designs.

The multi-fidelity approach has advantages within the design process. During the concept phase of a driveline design, a wide range of possible design structures and configurations need to be studied and in this instance, simple models are appropriate as they are quickest to create, analyse and interpret. As the design matures, the requirement for substantial change reduces up to the point of design freeze, where the highest level of fidelity is required to confirm the performance of the driveline.

In this invention, the process of transition from the earliest definition of the driveline to the final definition is seamless and smooth, since it simply involved updates to the Product Model, in which case all mathematical models already set up are automatically updated, and for each component the engineer has the choice to move from the lower fidelity model to the higher fidelity model.

As has been mentioned, the transition from high fidelity to low fidelity mathematical model assists in interpreting results and identifying dominating influences. However, it also has the benefit that the engineer can identify what parameters do/do not influence the driveline performance, and by how much.

If they have no effect, they can be eliminated from the analysis of the design. If they have little effect then they can be ignored until later in the design, when the level of fidelity of the other components justifies their inclusion. At all times, the engineer is able to ensure that the definition of the driveline is precisely suitable for the given stage of the design process and that any exclusion from the mathematical models is based on sound judgment.

The multi-fidelity approach allows the engineer to take the design of an existing system and systematically exclude parameters from the mathematical models, one by one, to see which ones are influential and thus which ones need to be included at which stage of the design process. This way the engineer can analyse an existing driveline and use these results as guidance for the new driveline, certain that the comparison is valid and "apples are being compared with apples". Again, the invention provides the opportunity for insightful data mining on existing applications and in itself becomes a tool for decision making and design optimisation.

In all cases, the simulation methods can be applied to the nominal dimensions for each component but also with each dimension varied according to manufacturing tolerances. The multi-fidelity approach described has been set up to ensure the best combination of speed of analysis and insight, and this is essential when it comes to considering manufacturing variability since this requires multiple runs of a given analysis. Thus, being able to have the most effective analysis for a given performance target is a prerequisite to being able to run such studies.

Figure 2:
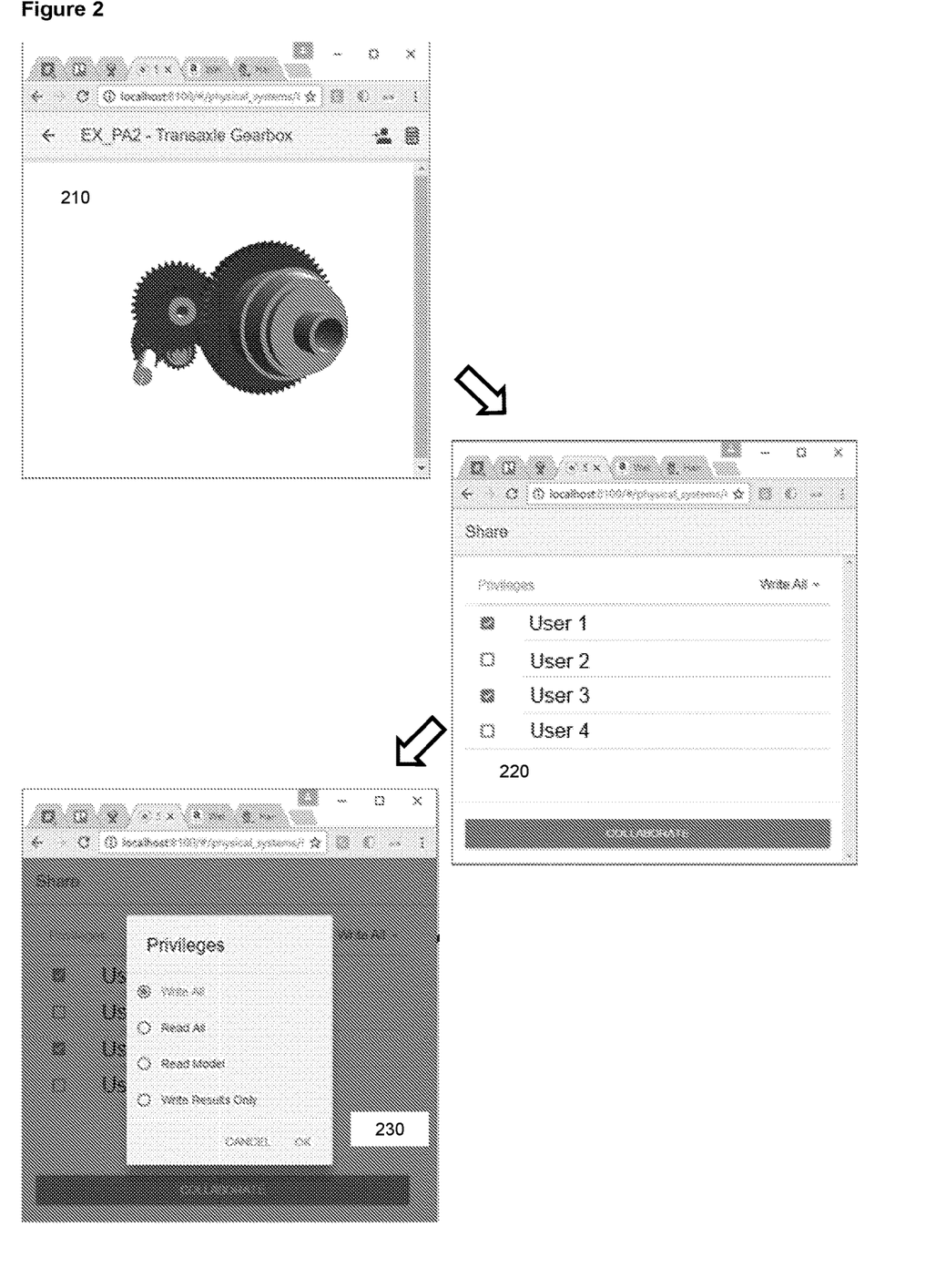
FIG. 2 shows an example workflow that occurs in an interface module.

One example of a work flow occurring in interface module 20 is illustrated in FIG. 2. In a first step 210, a user prepares a model of a one or more components of a rotating machine assembly using, interface module 20, in this example in the form of a web app. In a second step 220, the user shares the model with other users of the application. In a third step 230, users can select what the other parties can view or edit—e.g. limit collaboration to only viewing results. Sharing model data involves all users in a group having the model stored on a centralised and secure database. This could be a globally accessible database or a local database onsite at a particular location. When changes are made to the model by any collaborator, every user working on the model sees the changes immediately. This reduces the need for file tracking of model files, which means that large files do not have to be sent to support teams or team members. It also increases security, because all the data is still securely on the server. More than one person can work on a model a once, increasing team productivity.

Other analyses include interference fit between shaft sections; analytical and 3D FE approach to interference; mesh transition to bearing inner rings, roller bearings, gears, using hex/shell structure; inclusion of flexible bearing rings in a 3D driveline analysis for bearing out of round, also with the inclusion of FE contact; combining the analysis of bearing ring flexibility with housing stiffness and planet carrier stiffness; combining the analysis of bearing ring flexibility with planet gear loadsharing and gear mesh misalignment; multi-fidelity approaches to the bearing (5 versions), scanned back and forth; the ability to scan back and forth for multi-fidelity models of gears, shafts and bearings at the same time, either setting all versions of a component to a given level of fidelity or selecting them one by one; mesh transition from hex for the shafts to tet automesh for the housing; planet carrier and differential cage automesh (multi-fidelity geometry and mesh options); importing shaft with data depending on the purpose of the analysis (stress, deflection, frequency); SEA/FEA depending on frequency and requirement for fidelity; SEA for data mining, concept design; guidance on the bending frequency of a series of plate sections, to advise on the rib separation.

The invention claimed is:

1. A computer-implemented system for producing a design for a rotating machine assembly comprising:
   a data module configured for receiving data relating to one or more components of the rotating machine assembly, wherein the one or more components comprise a set of internal components, and data to be received by the data module comprises a user-defined wall thickness and clearance from rotating components;
   a user interface module configured for specifying data to be received by the data module and for receiving from a user a type of analysis to be performed on the data;
   a recognition module configured for identifying and selecting features of the data to be used for the analysis according to the type of analysis selected, wherein the recognition module is configured for identifying bearing outer rings and for determining that the bearing outer rings are to be supported by the housing; and
   an analysis module configured for analysing a performance of the rotating machine assembly according to the type of analysis selected and selected features of the data to be used,
   wherein the analysis module is configured to create a housing that wraps around the rotating components and to create a supporting cylinder that wraps around the bearing outer race, with length equal to the bearing width, inner diameter equal to the bearing outer diameter and user-defined outer diameter, the cylinder being integrated into the housing structure.

2. The system according to claim 1, in which the recognition module comprises a database of functional features of rotating machine components and their connections, and is configured to parse the data held in data module to identify features contained within its own database of functional features.

3. The system according to claim 1, in which the data module is configured to import CAD solid geometry for generalised shapes including housings, planet carriers, or differential cages; and CAD profiles of shafts.

4. The system according to claim 1, in which data provided to the data module comprises solid geometry imported from CAD and data relating to other components including shafts, bearings, and gears, and wherein these have been positioned, a 3D mesh is created by the analysis module.

5. The system according to claim 4, in which the 3D mesh is connected to further components comprising shafts, bearings and gears, and a process of condensation is performed by the analysis module.

6. The system according to claim 1, in which the analysis module analyses for performance data comprising non-linear stiffness calculation of rolling element bearings.

7. The system according to claim 1, in which the analysis module performs a stress analysis of a 3D FE mesh.

8. The system according to claim 1, in which the recognition module is configured to perform one or more of the following functions:
   i. identifying connections to shafts;
   ii. identifying that shaft sections are too short for a Timoshenko beam analysis;
   iii. automatically removing components not required for the analysis.

9. The system according to claim 1, in which the analysis module is configured to perform one or more of the following functions: i. using 2D shell elements when specified by the user in the interface module; ii. hex automeshing the shaft, recognising changes of section, fillet radii, radial holes, keyways, splines; iii. shell automeshing the shaft; iv. using hex, shell and Timoshenko beam elements; v. using different element types for different shaft in the same driveline model; vi. using different element types in the same shaft; vii. using a mesh structure that is not the same for each component; viii. using a mesh structure that is not the same within each component; ix. automatically determining the transition points between the components in the mesh structure.

10. A computer-implemented method of computer aided engineering for producing a design for a rotating machine assembly comprising the steps of:
    providing data relating to one or more components of the rotating machine assembly, wherein the one or more components comprise a set of internal components, and the provided data comprises a user-defined wall thickness and clearance from rotating components;
    receiving from a user a type of analysis to be performed on the data;
    recognising features of the data be used for the analysis according to the type of analysis selected,
    identifying bearing outer rings and that the bearing outer rings are to be supported by the housing;
    analysing a performance of the rotating machine assembly according to the type of analysis selected; and
    creating a housing that wraps around the rotating components and a supporting cylinder that wraps around the bearing outer race, with length equal to the bearing width, inner diameter equal to the bearing outer diameter and user-defined outer diameter, the cylinder being integrated into the housing structure.

11. The method according to claim 10, in which the data comprises CAD data.

12. The method according to claim 10, additionally comprising the step of determining the analytically structure for the type of analysis selected.

13. The method according to claim 10, in which the data comprises shaft data and includes a bearing support selected from: (i) a simple radial support, then, with increasing degrees of complexity, (ii) a simple support with axial constraints and contact angles corresponding to the bearing type, (iii) a bearing model with Hertzian contact elements and rigid inner and outer raceways, (iv) a bearing model with Hertzian contact elements and flexible inner and outer raceways and (v) a finite element bearing model with flexible rollers, contact stiffness and flexible inner and outer raceways.

14. The method according to claim 10, in which a user specifying a type of analysis to be performed on the data comprises selecting a level of fidelity.

15. The method according to claim 10, in which a user specifying a type of analysis to be performed on the data comprises selecting a frequency of analysis.

\* \* \* \* \*